(12) United States Patent
Lacaze et al.

(10) Patent No.: US 8,954,853 B2
(45) Date of Patent: Feb. 10, 2015

(54) METHOD AND SYSTEM FOR VISUALIZATION ENHANCEMENT FOR SITUATIONAL AWARENESS

(75) Inventors: Alberto Daniel Lacaze, Potomac, MD (US); Karl Nicholas Murphy, Rockville, MD (US); Anne Rachel Schneider, Gaithersburg, MD (US); Raymond Paul Wilhelm, III, Gaithersburg, MD (US)

(73) Assignee: Robotic Research, LLC, Gaithersburg, MD (US)

( * ) Notice: Subject to any disclaimer, the term of this patent is extended or adjusted under 35 U.S.C. 154(b) by 188 days.

(21) Appl. No.: 13/604,842

(22) Filed: Sep. 6, 2012

(65) Prior Publication Data

US 2014/0068439 A1 Mar. 6, 2014

(51) Int. Cl.
*G06F 3/0485* (2013.01)
*G06F 3/0484* (2013.01)
*G11B 27/10* (2006.01)

(52) U.S. Cl.
CPC ........ *G06F 3/04855* (2013.01); *G06F 3/04842* (2013.01); *G11B 27/105* (2013.01)
USPC .............. 715/720; 715/719; 715/849; 701/25

(58) Field of Classification Search
CPC .......................... G06F 3/04855; G06F 4/04842
USPC .......... 715/720, 716, 719, 201, 849; 701/211; 348/211
See application file for complete search history.

(56) References Cited

U.S. PATENT DOCUMENTS

| | | | |
|---|---|---|---|
| 6,697,105 B1* | 2/2004 | Kato et al. ................. | 348/211.6 |
| 6,833,843 B2* | 12/2004 | Mojaver et al. ............. | 345/647 |
| 6,934,002 B1* | 8/2005 | Setteducati ................. | 352/133 |
| 7,526,718 B2* | 4/2009 | Samadani et al. ........... | 715/201 |
| 7,697,559 B2* | 4/2010 | Yonemoto et al. ........... | 370/432 |
| 7,777,648 B2* | 8/2010 | Smith et al. ................. | 340/995.1 |
| 7,827,507 B2* | 11/2010 | Geise et al. ................. | 715/850 |
| 7,912,596 B2* | 3/2011 | Goossen et al. ............. | 701/25 |
| 8,200,720 B2* | 6/2012 | Harada ........................ | 707/821 |
| 8,289,392 B2* | 10/2012 | Senior et al. ................ | 348/154 |
| 8,290,303 B2* | 10/2012 | Washburn et al. .......... | 382/294 |
| 2006/0282776 A1* | 12/2006 | Farmer et al. ............... | 715/719 |
| 2008/0028323 A1* | 1/2008 | Rosen et al. ................ | 715/752 |
| 2008/0109729 A1* | 5/2008 | Notea et al. ................. | 715/722 |
| 2009/0225164 A1* | 9/2009 | Renkis ......................... | 348/143 |
| 2009/0259943 A1* | 10/2009 | Barsook et al. ............. | 715/730 |
| 2009/0271719 A1* | 10/2009 | Clare et al. .................. | 715/762 |
| 2010/0313146 A1* | 12/2010 | Nielsen et al. .............. | 715/757 |
| 2011/0010674 A1* | 1/2011 | Knize et al. ................. | 715/849 |
| 2012/0266068 A1* | 10/2012 | Ryman et al. ............... | 715/719 |
| 2013/0174087 A1* | 7/2013 | Chen et al. .................. | 715/800 |

\* cited by examiner

*Primary Examiner* — Alvin Tan
*Assistant Examiner* — Jasmine Wan
(74) *Attorney, Agent, or Firm* — White-Welker & Welker, LLC; Matthew T. Welker, Esq.

(57) ABSTRACT

An after-action, mission review tool that displays camera and navigation sensor data allowing a user to pan, tilt, and zoom through the images from front and back cameras on an vehicle, while simultaneously viewing time/date information, along with any available navigation information such as the latitude and longitude of the vehicle at that time instance. Also displayed is a visual representation of the path the vehicle traversed; when the user clicks on the path, the image is automatically changed to the image corresponding to that position. If aerial images of the area are available, the path can be plotted on the geo-referenced image.

26 Claims, 23 Drawing Sheets

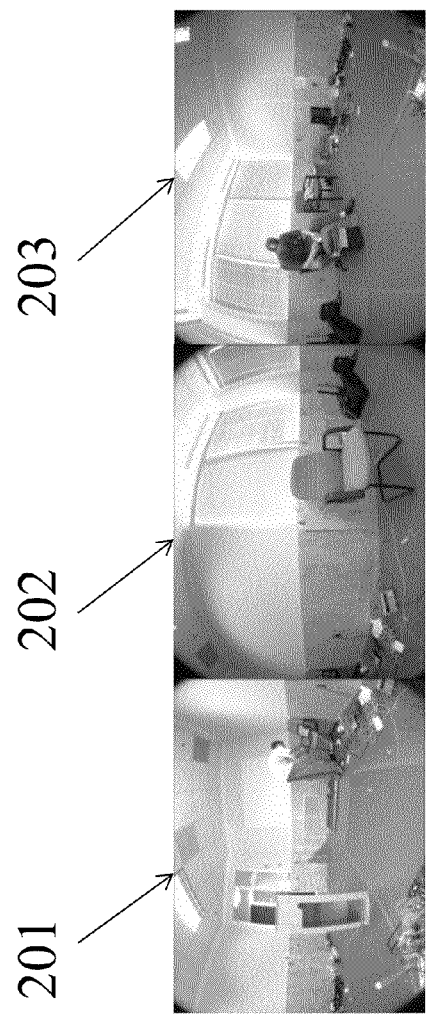
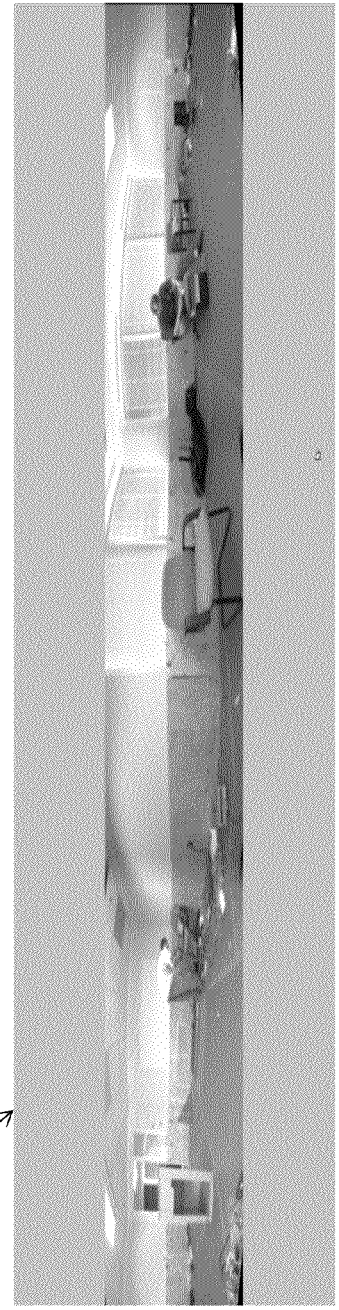

METHOD AND SYSTEM FOR VISUALIZATION ENHANCEMENT FOR SITUATIONAL AWARENESS

FEDERALLY SPONSORED RESEARCH

Not Applicable

SEQUENCE LISTING OR PROGRAM

Not Applicable

CROSS REFERENCE TO RELATED APPLICATIONS

Not Applicable

TECHNICAL FIELD OF THE INVENTION

This invention relates to robotic mapping systems. In particular, the invention relates to a robotic mapping system providing situational awareness based on previously recorded mapping data.

BACKGROUND OF THE INVENTION

Unmanned Ground Vehicles (UGVs) are useful for taking people out of harm's way. Although there have been many advances in using these vehicles, one of the key areas that is currently lacking is the poor situational awareness provided to operators.

Military operations in urban areas often involve action in unknown environments such as buildings, tunnels, streets, and alleys. Having access to advanced intelligence in the area of operation increases the preparedness the soldiers when the operation begins. However, conducting "sweeps" of unknown areas can results in casualties and fatalities for warfighters. Additionally, a soldiers' ability to successfully complete a mission is frequently impaired by a lack of information about a structure and/or the locations of potentially hostile individuals within that structure. A robotic mapping system that provides a realistic, high-resolution three-dimensional graphics database that clearly depicts and geo-locates the interior and exterior of a building, prior to soldiers entering the structure, provides a significant benefit to ground forces.

When a robot maps the building, tools are needed in order translate the raw data to an easy-to understand visualization display for the operator. This output must represent the environment, within which a small UGV traveled, in an intuitive and easily-understood way. A widely-used visualization tool consists of viewing a video stream from a platform's camera. However, with a video stream, the user cannot easily change perspective, zoom, follow the image frames in an order other than that with which they were captured, or gain a sense of depth for objects within the image. Moreover, video imposes high bandwidth requirements. A strong visualization tool creates a very realistic representation of the environment that the user can navigate in any way desired.

SUMMARY OF THE INVENTION

The present invention is an after-action and real time mission review tool that displays camera, ladar and navigation sensor data. The present invention allows the user to pan, tilt, and zoom through the images from the front and back cameras on the robot, while simultaneously viewing time/date information, along with any available navigation information (e.g., the latitude and longitude of the robot at that time instance). Also displayed is a visual representation of the path the robot traversed; when the user clicks on the path, the image is automatically changed to the image corresponding to that position. If aerial images of the area are available, the path can be plotted on the geo-referenced image. The tool geo-registers images and maps so that they can be retrieved based on location and time. The system allows the user to compare information from multiple data collections by "locking" the images as the operator pan, tilt and zooms.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIGS. 2a and 2b show the three separate images from the cameras as well as the 360 degree omni-directional image;

FIGS. 20-22 illustrate where, in the next frame, the barrel is now automatically centered on the screen.

DEFINITIONS

Figure 1:
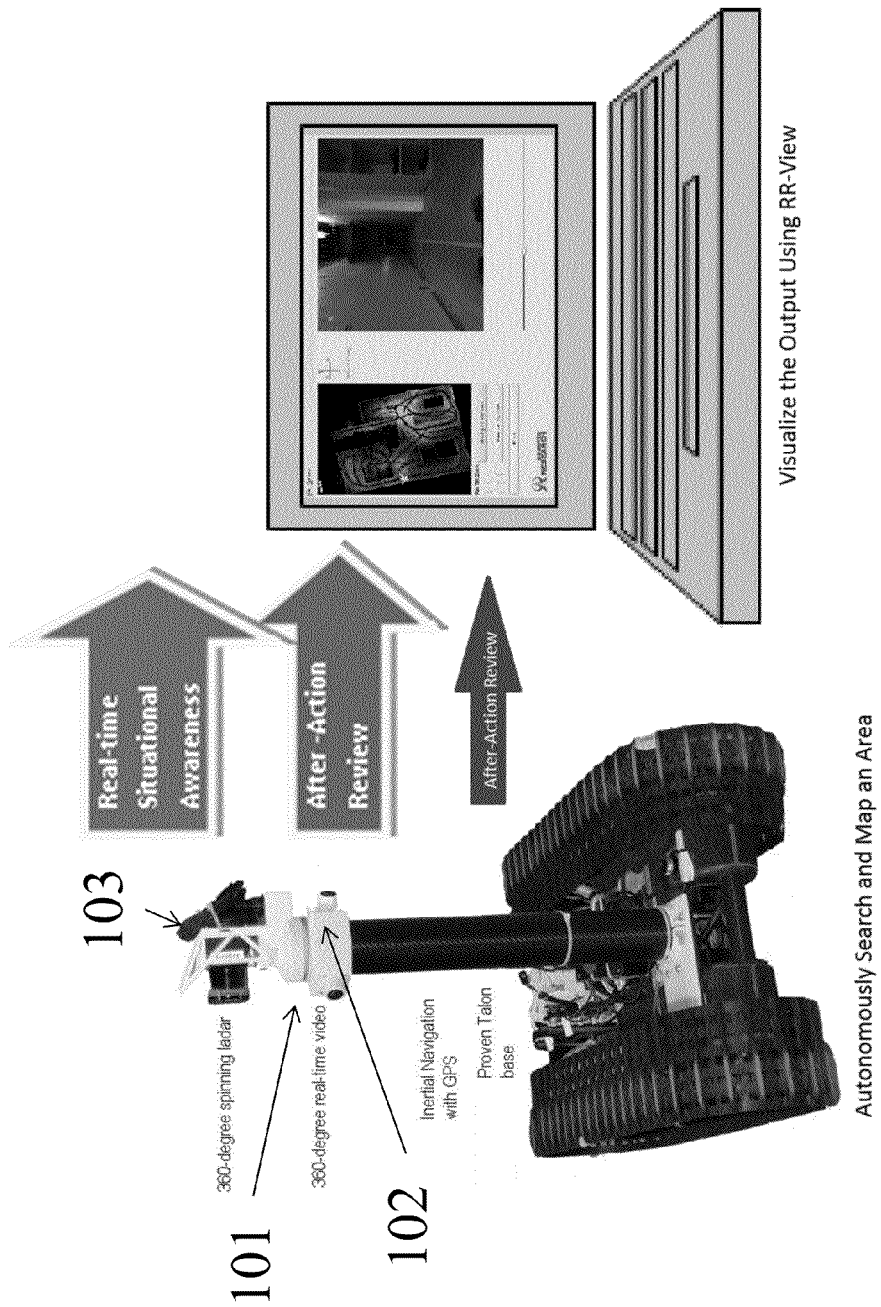
FIG. 1 illustrates the VESA concept: visualization tools.

VESA is defined as Visualization Enhancement for Situational Awareness.

UGV is defined as is an unmanned ground vehicle that operates while in contact with the ground and without an onboard human presence. UGVs can be used for many applications where it may be inconvenient, dangerous, or impossible to have a human operator present. Generally, the vehicle will have a set of sensors to observe the environment, and will either autonomously make decisions about its behavior or pass the information to a human operator at a different location who will control the vehicle through teleoperation.

LADAR (also known as LIDAR) is an optical remote sensing technology that can measure the distance to, or other properties of a target by illuminating the target with light, often using pulses from a laser. LIDAR technology has application in geomatics, archaeology, geography, geology, geomorphology, seismology, forestry, remote sensing and atmospheric physics, as well as in airborne laser swath mapping (ALSM), laser altimetry and LIDAR contour mapping. The acronym LADAR (Laser Detection and Ranging) is often used in military contexts. The term "laser radar" is sometimes used, even though LIDAR does not employ microwaves or radio waves and therefore is not radar in the strict sense of the word.

DAQ (also referred to as "buf" or "blackbox") are files that record the navigation information of the UGV. These files are time and date stamped, making it simple to determine which files correspond to a mission.

DBS is a network-accessible storage layer that will use the resources of many machines to provide transactional read-write access for fixed-size blocks of binary data.

In computing, a graphical user interface (GUI, commonly pronounced gooey) is a type of user interface that allows users to interact with electronic devices using images rather than text commands. GUIs can be used in computers, hand-held devices such as MP3 players, portable media players or gaming devices, household appliances and office equipment. A GUI represents the information and actions available to a user through graphical icons and visual indicators such as secondary notation, as opposed to text-based interfaces, typed command labels or text navigation. The actions are usually performed through direct manipulation of the graphical elements.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

During an initial phase of development, the inventors began work on a Visualization Enhancement for Situational Awareness toolkit referred to as VESA. The goal of the VESA toolkit project was to combine autonomy with accurate mapping and visualization capabilities for use on vehicles or robotic systems. The inventors worked on creating a visualization widget to display imagery, as well as mapping results, from a small robot which has traveled through an unknown environment. VESA is designed to work with a variety of sensors; while cameras form the base of the visualization tool, if a LADAR is present on the robot, then that information will be able to be displayed as well. The soldiers are then able to analyze the information prior to entering the structure. Because of VESA's capabilities, each soldier knows the basic structural layout, therefore greatly enhancing the team's situational awareness.

The inventors have developed hardware and software for a sensor system that is specifically designed and implemented on a variety of platforms. These platforms were used to collect data during a first phase of VESA The machine components of the present invention consist of the VESA concept: visualization tools as shown in FIG. 1. The present camera system consists of three machine vision cameras 101, 102, and 103 with fisheye lenses. Each camera has a 150 degree field-of-view, and is mounted so that a user has access to a full 360 degree field-of-view around the vehicle. More cameras with a smaller field of view or fewer cameras with a larger field of view may be used. The inventors choose to use multiple cameras, as opposed to a single forward-looking lens/camera configuration, to significantly increase the area can be modeled and texture mapped. Because each of the overlapping field-of-view of adjacent cameras, the images can be stitched in such a way as to create an omni-directional image of the scene around the robot. FIGS. 2a and 2b show the three separate images from the cameras 201, 202, and 203, as well as the 360 degree omni-directional image 204.

During a first phase, the inventors developed the present invention Situational Awareness Toolkit. The main goal of this toolkit is to improve the situational awareness of a soldier by providing an intuitive and easy-to-use way to "walk through" and interact with the sensor and navigation data of the robot during and post mission.

Figure 3:
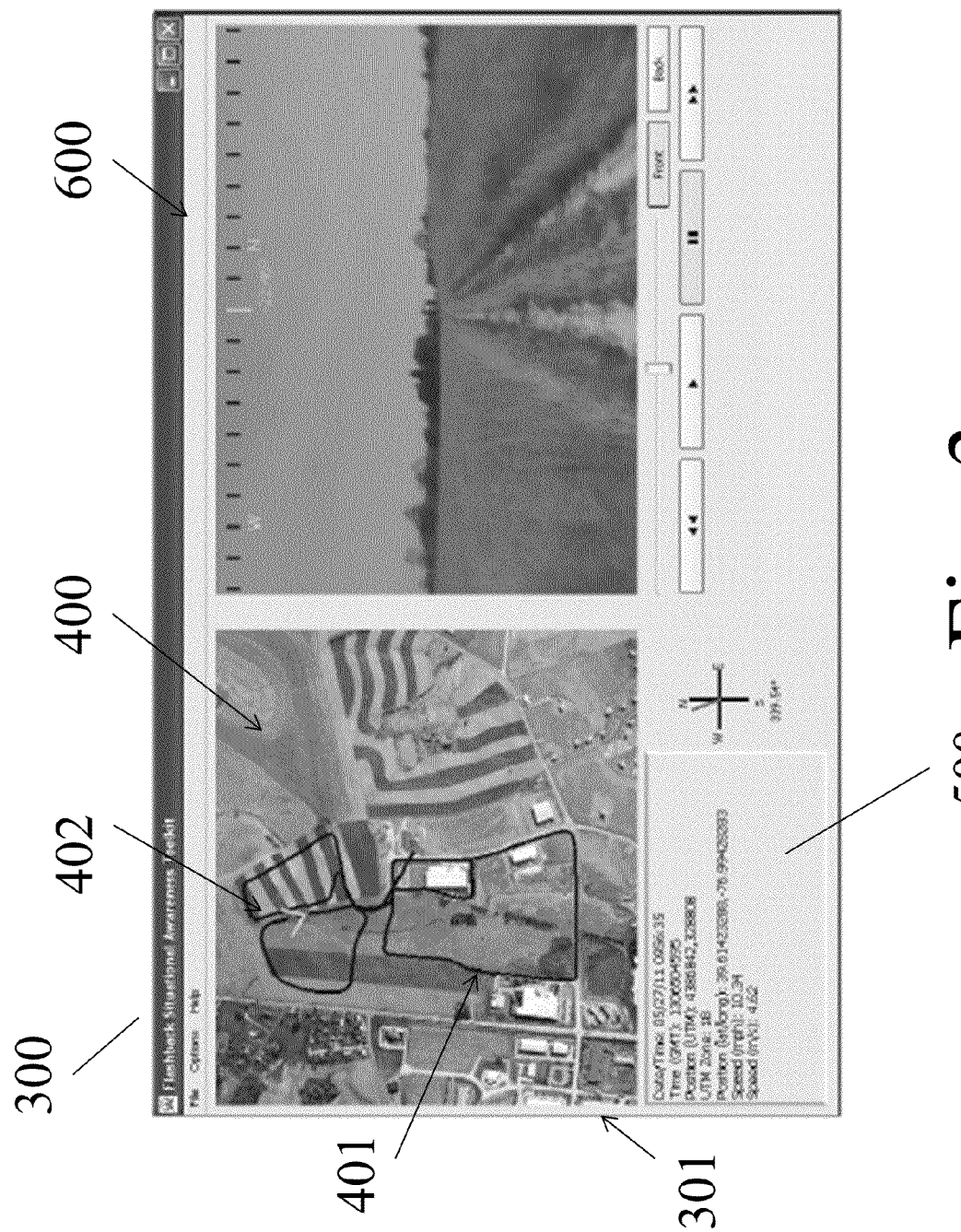
FIG. 3 is a screen shot of the display of the computer interfaced for executing the method of the present invention.
Figure 4:
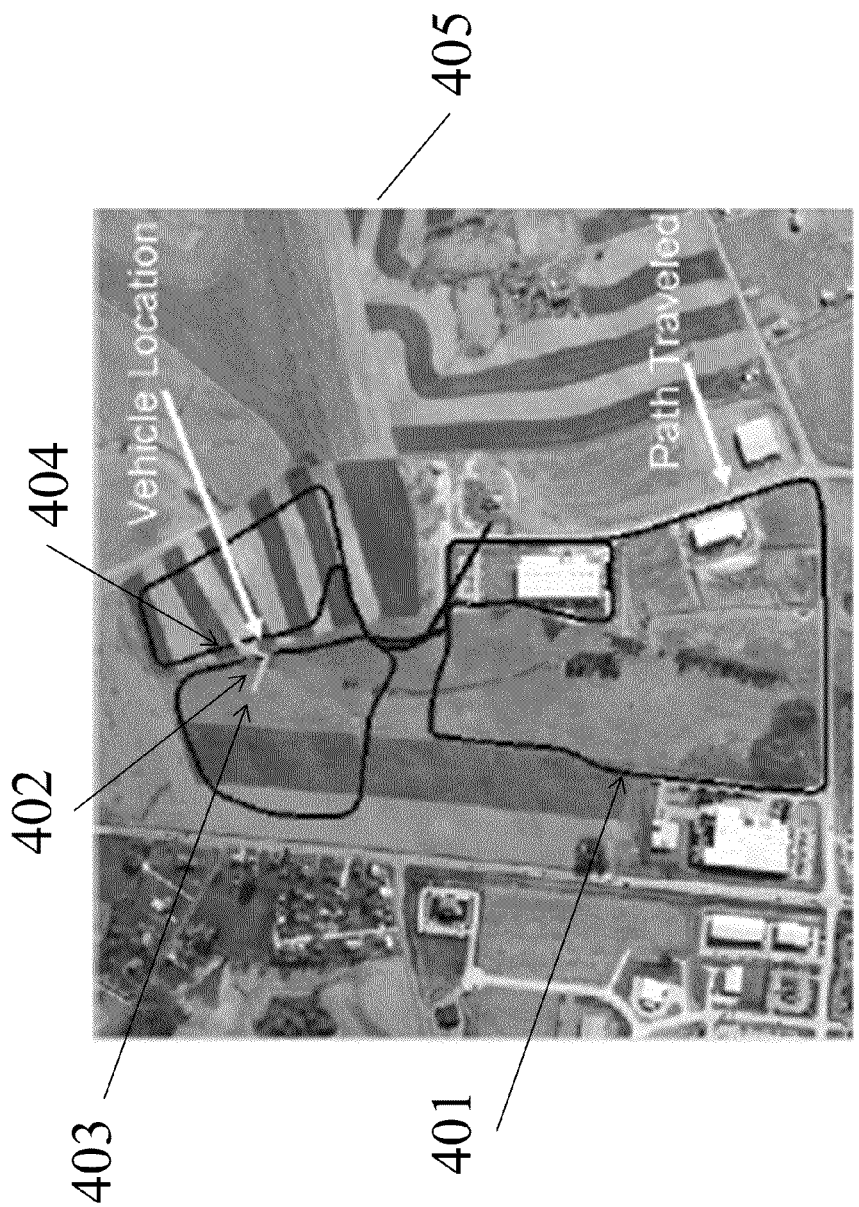
FIG. 4 illustrates the navigational map component of the interface display used by the present invention.

The method of the present invention is enabled by software executed on a computer machine. The interface 300 for a user interacting with the software running and/or executing the method of the present invention is shown in FIG. 3. Referring to FIGS. 3 and 4, on the left side of the window 301 is the navigation map 400 as shown individually in FIG. 4 The navigation map 400 displays the traveled path 401 in a first color, if available. The current position of the vehicle is indicated by a triangle 402 in a second color, where the front of the vehicle is designated by the point of the triangle. The field of view (FOV) of the camera is also indicated on the triangle by the two adjacent lines 403 and 404, shown in a third color if available.

If the FOV lines 403 and 404 are centered towards the back of the vehicle, the camera image being displayed is taken from the rear camera of the vehicle. If the FOV lines 403 and 404 are spread far apart (indicating a wide FOV), the image is zoomed far out. Vice-versa, if the FOV lines 403 and 404 are close together, the image is zoomed in to a smaller section of the environment. If aerial imagery 405 is available, it can be displayed as well and the navigation map 400 superimposed or laid over top of the aerial imagery 405 using GPS to align the aerial imagery 405 with the navigation map 400.

Figure 5:
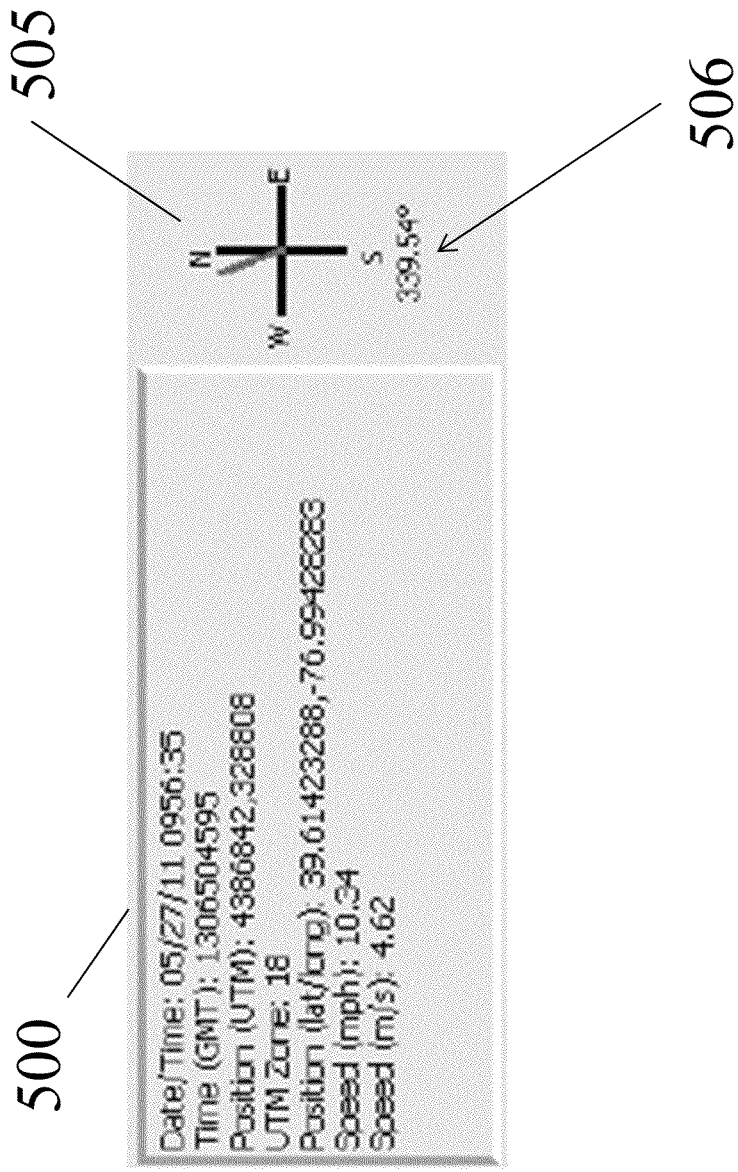
FIG. 5 illustrates the status display component of the interface display used by the present invention.

A status display 500 is located in the bottom left corner of the window as shown in FIG. 3 and individually in FIG. 5. The information displayed includes the date and time of the mission 501, along with the GMT time in seconds 502. Also displayed, if available, are the position of the robot in UTM and lat/long position 503, and vehicle speed (in miles per hour and meters per second) 504. A directional compass 505 located towards the right of the display info shows the vehicle's current cardinal direction of travel. Listed below the compass is the cardinal direction of the vehicle in degrees 506.

Figure 6:
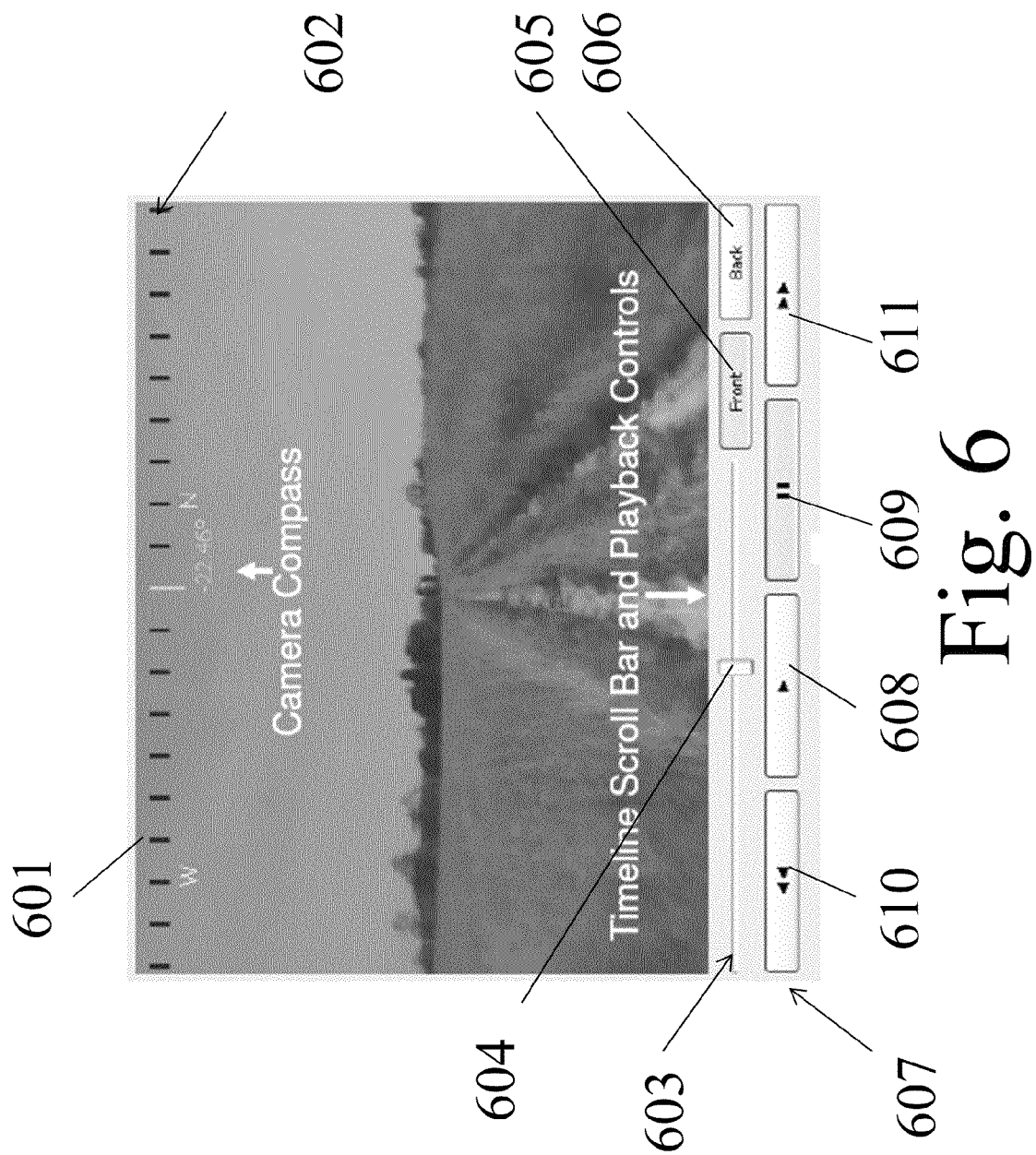
FIG. 6 illustrates the camera image and timeline scroll bar component of the interface display used by the present invention.

A de-warped image taken from the camera is located on the right side of the window 600 as shown in FIG. 3 and individually in FIG. 6. The image displayed 601 is the image taken from the camera at a given point in time. Overlaid on the top of the image display 600 is the cardinal direction of the displayed camera image 602. The direction 602 changes with camera panning within the still frame image. Below the camera image 601 is a horizontal scroll bar 603 used to progress through the timeline of the mission. Each slider increment 604 is equivalent to moving one second in time. The scroll bar 603 also allows a user to jump to any point from the beginning to the end of the trial. The left and right keyboard keys allow for quickly incrementing or decrementing of the slider 604. The 'Front' and 'Back' buttons 605 and 606 next to the scroll bar 603 allow the user to toggle between the front camera and the rear camera of the vehicle. Beneath the scroll bar 603 is a set of playback controls 607 that allow the user to play 608, pause 609, rewind 610, and fast forward 611 through the images. Repeatedly pressing the rewind 610 or fast-forward 611 buttons increases the speed.

Figure 7:
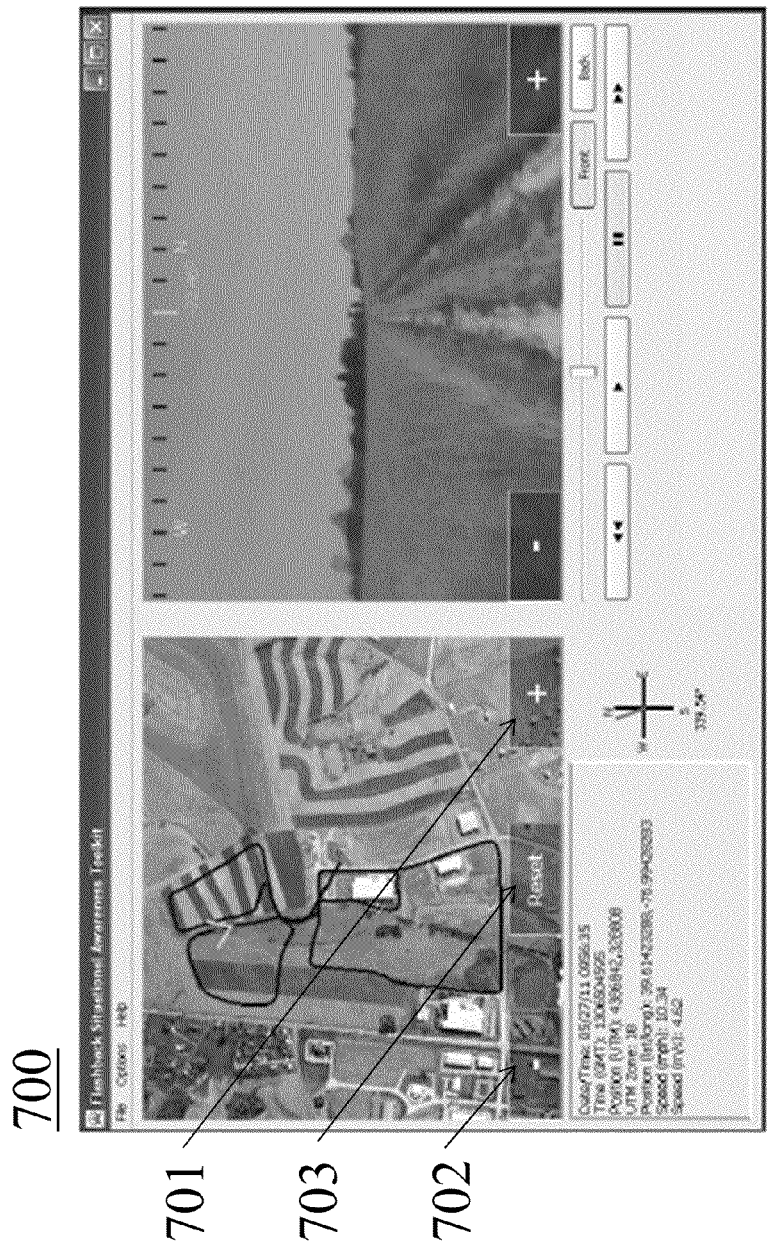
FIG. 7 illustrates a touch screen embodiment of the interface display used by the present invention.

To facilitate ease-of-use with touch screen devices, buttons can be displayed that replicate some of the features usually accessed with mouse commands. The touch screen button interface 700 is shown in FIG. 7. The "+" and "−" buttons 701 and 702 are used to zoom in and out, respectively, while the "Reset" button 703 will re-center the navigation map. These buttons can be toggled on and off.

There are two main tasks involved in running the present invention: getting data from the vehicle and opening/viewing the data. The data required to run the present invention consists of image files (.jpg) from the vehicle's cameras and daq (referred to as "buf" or "blackbox") files that record the navigation information. These files are time and date stamped, making it simple to determine which files correspond to the current mission. When getting data from the robot, the goal is to put the all the image and daq files from a single mission into a folder on the computer on which a user will be running the software executing the method of the present invention. Each mission should have its own separate folder to ensure that the data loads correctly. There are two ways to get data from the vehicle—getting the files locally or remotely over the network.

There are two ways to explore the images of the path mapped by the vehicle: in space by clicking on any point of the navigation map 400 or in time by using the horizontal scroll bar 603 or playback controls 607 below the camera image 601. In each case, the point selected on either the navigation map 400 or the scroll bar 603 will display the corresponding camera image 601 at the vehicle's respective time and position. The scroll bar 603 can be incremented or decremented by using the left and right arrow keys on the keyboard of the computer running the software executing the method of the present invention.

Alternatively, the play/rewind/fast-forward controls will automatically cycle through the images. By clicking and dragging the camera image, the user can rotate the camera to further inspect the image. The scroll button on the mouse can be used to zoom in or out of the image when the cursor is on the image. By clicking the left and right mouse buttons simultaneously and dragging on the image, a user can also zoom in or out of the image.

In Touch Screen Mode, a user can use the "+" and "−" buttons 701 and 702 to zoom in and out instead of using a mouse. Using the "Reset" Button 703 will reset the navigation map 400.

Figure 8:
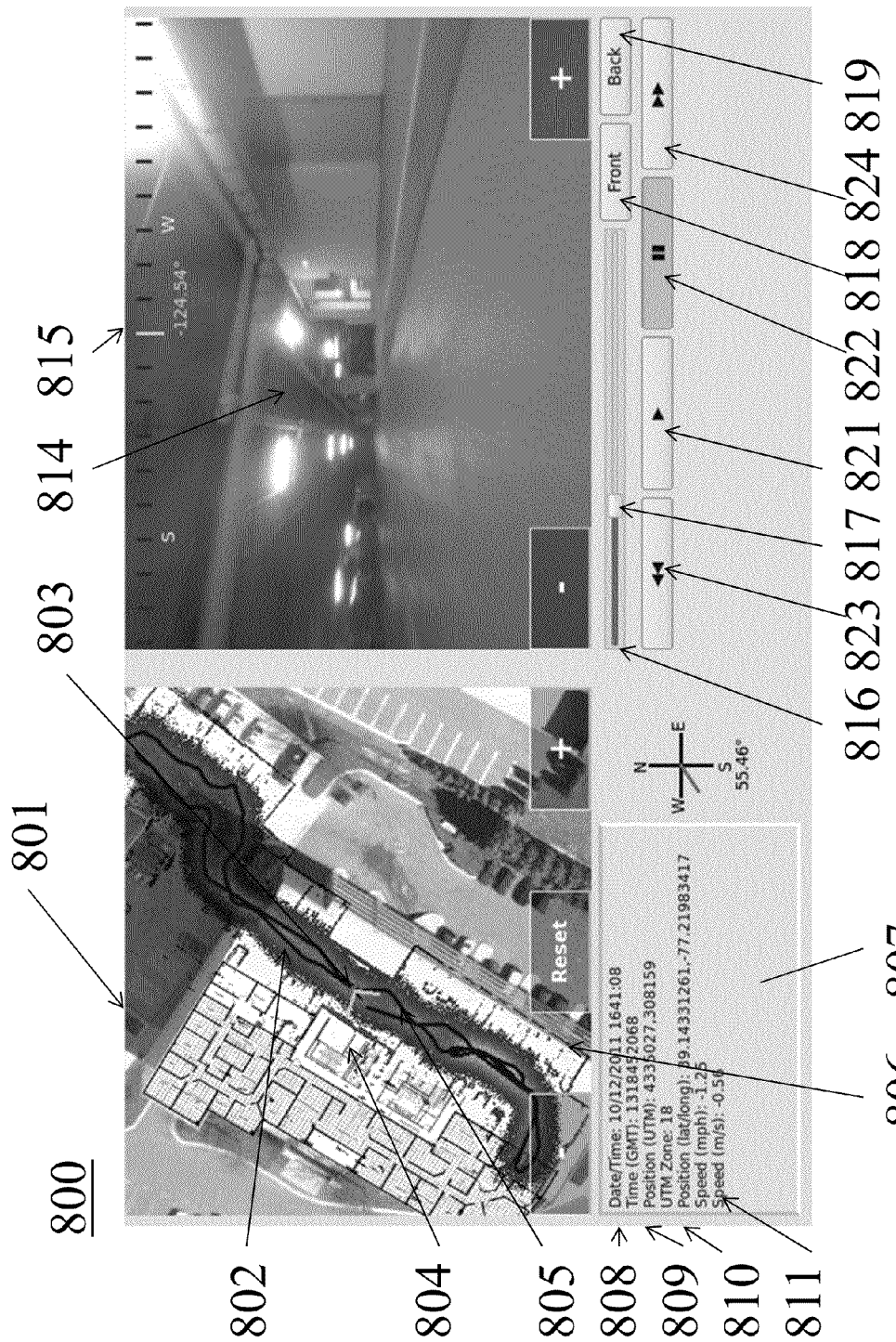
FIG. 8 is a screen shot of the display of an alternative embodiment of the computer interfaced for executing the method of the present invention.

Now referring to FIG. 8, an alternative user interface is shown with alternative, additional, and/or improved features are illustrated. The interface 800 of the alternative embodiment is for a user interacting with the software running and/or executing the method of the present invention is shown in FIG. 8. Referring to FIG. 8, on the left side of the window 800 is the navigation map 801. The navigation map 801 displays the traveled path 802 of the vehicle as created by two-dimensional LADAR in a first color, if available. The LADAR maps 815 are now semi-transparent when compared to the embodiment of FIG. 3, allowing the user to view the aerial imagery underneath the map. The current position of the vehicle is indicated by a triangle 803 in a second color, where the front of the vehicle is designated by the point of the triangle. The field of view (FOV) of the camera is also indicated on the triangle by the two adjacent lines 804 and 805, shown in a third color if available.

If the FOV lines 804 and 805 are centered towards the back of the vehicle, the camera image being displayed is taken from the rear camera of the vehicle. If the FOV lines 804 and 805 are spread far apart (indicating a wide FOV), the image is zoomed far out. Vice-versa, if the FOV lines 804 and 805 are close together, the image is zoomed in to a smaller section of the environment. If geo-referenced aerial imagery 806 is available, it can be overlaid beneath the path of the robot for better situational awareness. If aerial imagery 806 is available, it can be displayed as well and the navigation map 801 superimposed or laid over top of the aerial imagery 806 using GPS to align the aerial imagery 806 with the navigation map 801.

A status display 807 is located in the bottom left corner of the window as shown in FIG. 8 The information displayed includes the date and time of the mission 808, along with the GMT time in seconds 809. Also displayed, if available, are the position of the robot in UTM and lat/long position 810, and vehicle speed (in miles per hour and meters per second) 811. A directional compass 812 located towards the right of the display info shows the vehicle's current cardinal direction of travel. Listed below the compass is the cardinal direction of the vehicle in degrees 813.

A de-warped image taken from the camera 814 is located on the right side of the window 800 as shown in FIG. 8. The image displayed 814 is the image taken from the camera at a given point in time. Overlaid on the top of the image display 814 is the cardinal direction of the displayed camera image 815. The direction 815 changes with camera panning within the still frame image. Below the camera image 814 is a horizontal scroll bar 816 used to progress through the timeline of the mission. Each slider increment 817 is equivalent to moving one second in time. The scroll bar 816 also allows a user to jump to any point from the beginning to the end of the trial. The left and right keyboard keys allow for quickly incrementing or decrementing of the slider 817. The 'Front' and 'Back' buttons 818 and 819 next to the scroll bar 816 allow the user to toggle between the front camera and the rear camera of the vehicle. Beneath the scroll bar 816 is a set of playback controls 820 that allow the user to play 821, pause 822, rewind 823, and fast forward 824 through the images. Repeatedly pressing the rewind 823 or fast-forward 824 buttons increases the speed.

Figure 9:
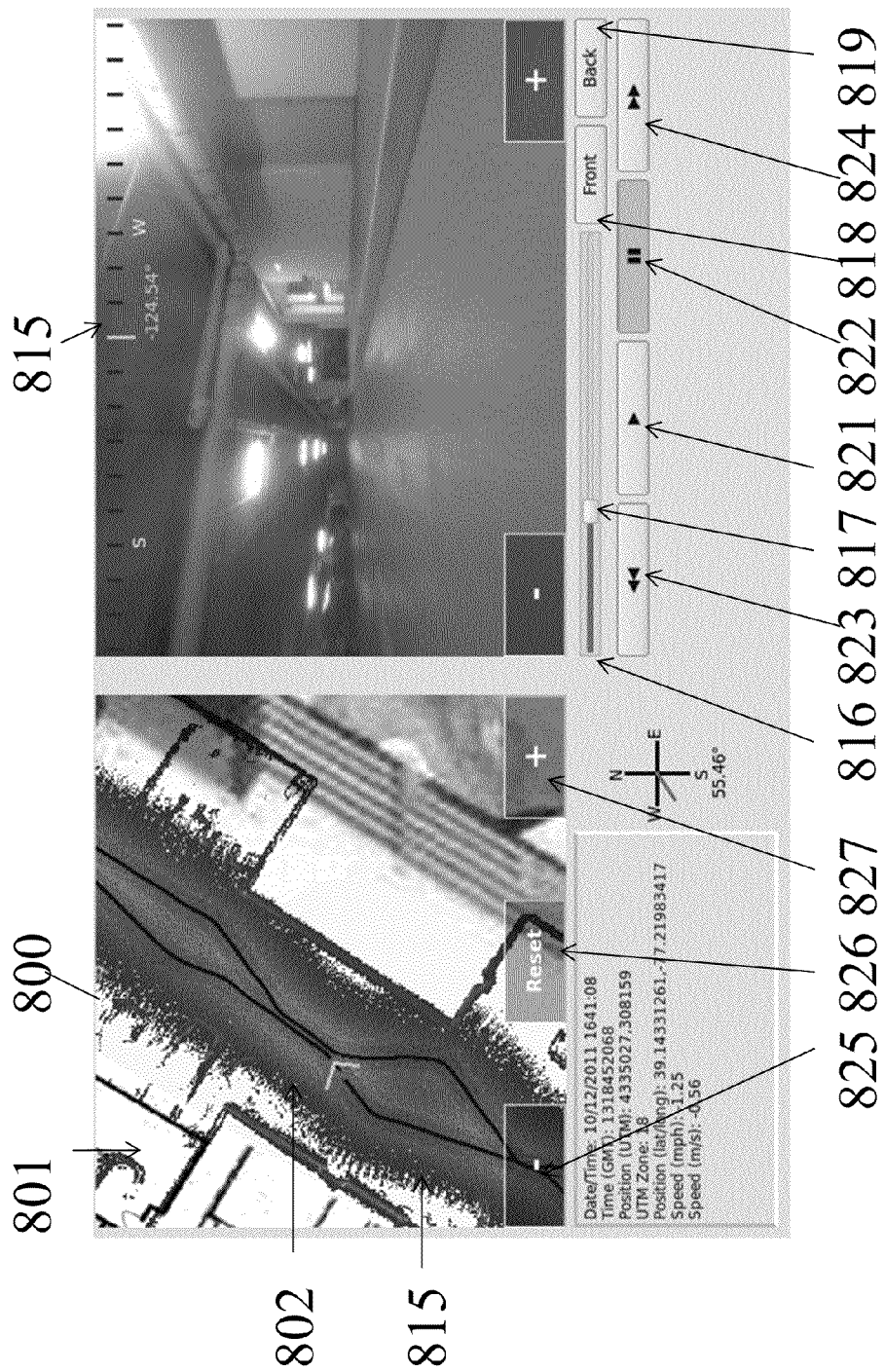
FIG. 9 is a screen shot illustrating the zoomable map feature of the display of the present invention.

Referring to FIG. 9, the map area 801 where the robot path 802, LADAR 815, and aerial imagery 806 are displayed can now be panned and zoomed to get a detailed view of the area.

There are two ways to explore the images of the path mapped by the vehicle: in space by clicking on any point of the navigation map 800 or in time by using the horizontal scroll bar 816 or playback controls 817 below the camera image 814. In each case, the point selected on either the navigation map 800 or the scroll bar 816 will display the corresponding camera image 814 at the vehicle's respective time and position. The scroll bar 816 can be incremented or decremented by using the left and right arrow keys on the keyboard of the computer running the software executing the method of the present invention.

Alternatively, the play/rewind/fast-forward controls will automatically cycle through the images. By clicking and dragging the camera image, the user can rotate the camera to further inspect the image. The scroll button on the mouse can be used to zoom in or out of the image when the cursor is on the image. By clicking the left and right mouse buttons simultaneously and dragging on the image, a user can also zoom in or out of the image.

In Touch Screen Mode, a user can use the "+" and "−" buttons 827 and 825 to zoom in and out instead of using a mouse. Using the "Reset" Button 826 will reset the navigation map 800.

Figure 10:
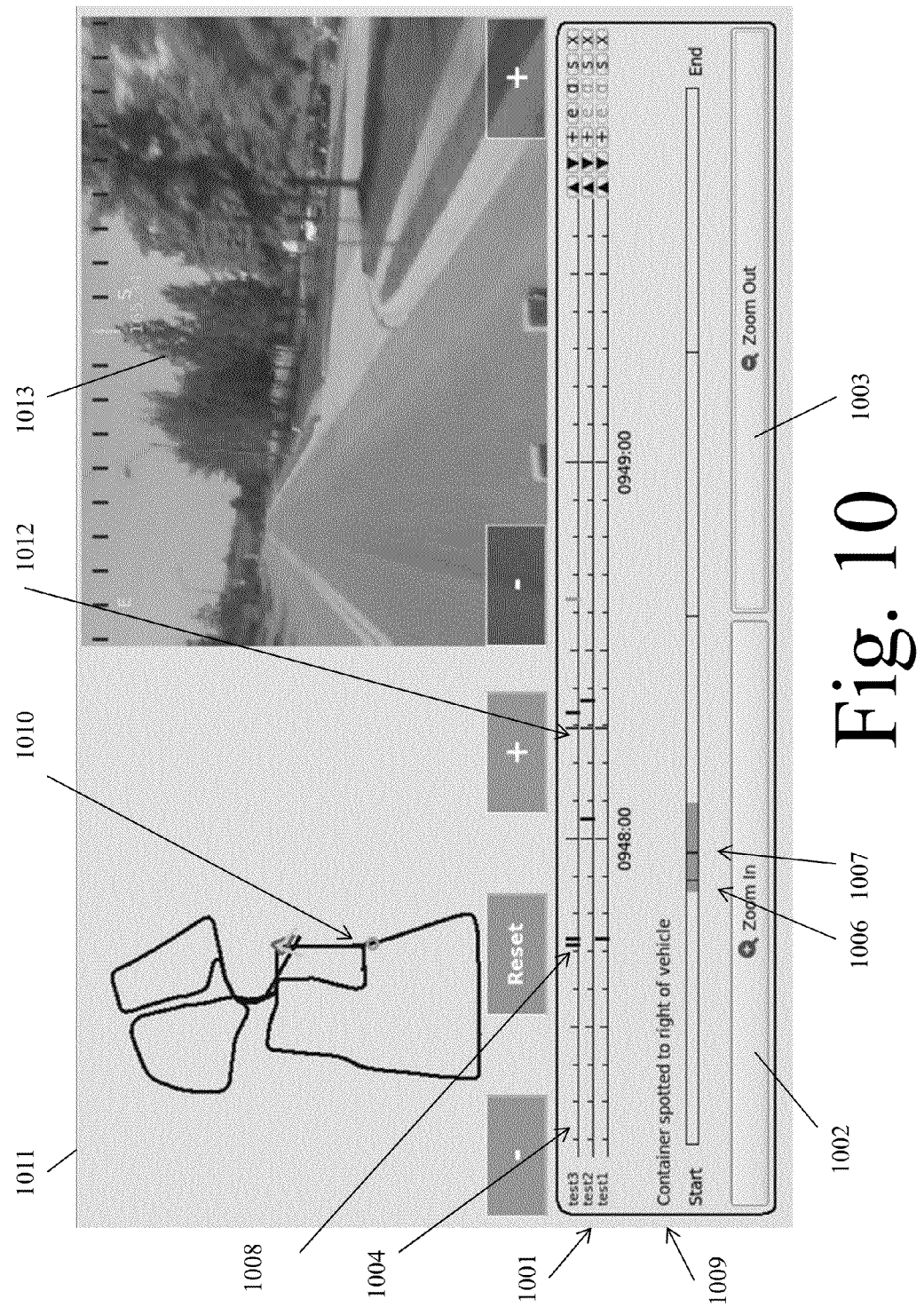
FIG. 10 is a screen shot of the event file interface of the present invention.

In still another alternative embodiment shown in FIG. 10, an event view mode is displayed that allows the user to tag events in the video. The event file format is generic so that it can be created using the present invention, or can be written by different processes on a robot to record any notable events automatically (e.g., emergency stops, periods of time with no plans, high speed or curvature events).

Multiple event files can be loaded and are each displayed on separate timelines 1001. Each timeline 1001 is zoom-able using the buttons 1002 and 1003 at the bottom of the screen 1000. The user can drag on the timeline 1001 to display different portions 1004 of the timeline 1001. Below the timelines 1001, an overview bar 1005 displays, as denoted by a first colored line 1006, what portion of the overall timeline 1001 is being displayed and the current image location, a denoted by second colored line or bar 1007. The second colored line or bar 1007 can be dragged to quickly access other portions of the timelines 1001.

Events are noted by a colored line or bar 1008 on the timeline 1001. Each event can be selected and the comment 1009 from that event is displayed beneath the timelines 1001. The (x,y) location 1010 of that comment 1009 is plotted as a colored circle 1010 on the map 1011. The current image position is represented by a colored line 1012 on the timelines 1001. That line 1012 can be dragged to move forward or backward in the images.

Figure 11:
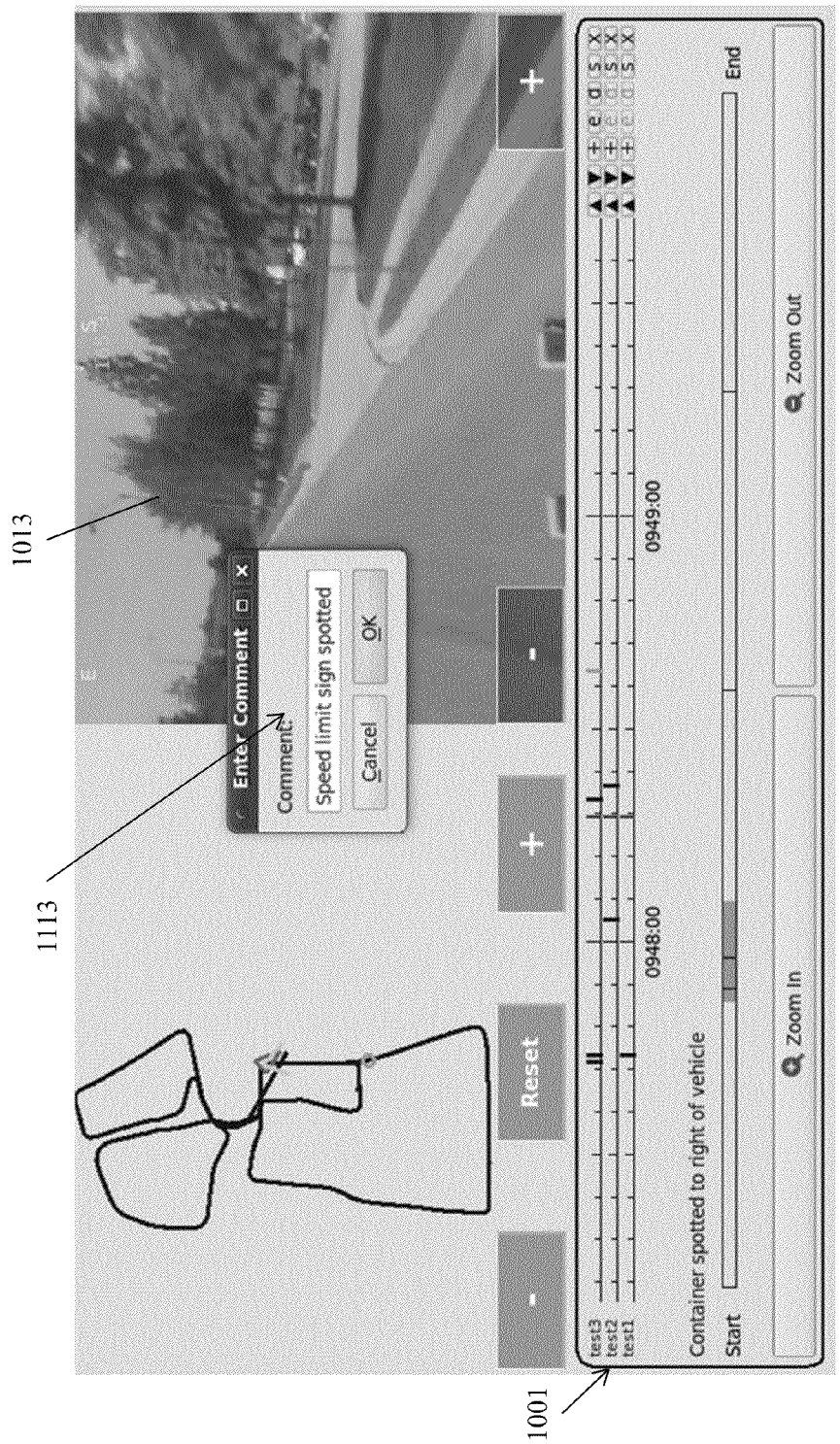
FIG. 11 is a screen shot of the event adding feature of the present invention.

Now referring to FIG. 11, on each timeline 1001, an event 1113 can be added, edited, or deleted. There is also a save option to save the edits to the event file(s). Each timeline 1001 can be moved up or down for easily comparing events, and can also be closed if no longer needed.

Initially, the present invention only displayed the 360 image viewer 1013; when displaying 3D maps, a separate program was launched. The downside of this was that the two programs had separate controls, so the area being seen on the image would not correspond directly to the 3D data without a lot of manual work by the operator.

Figure 12:
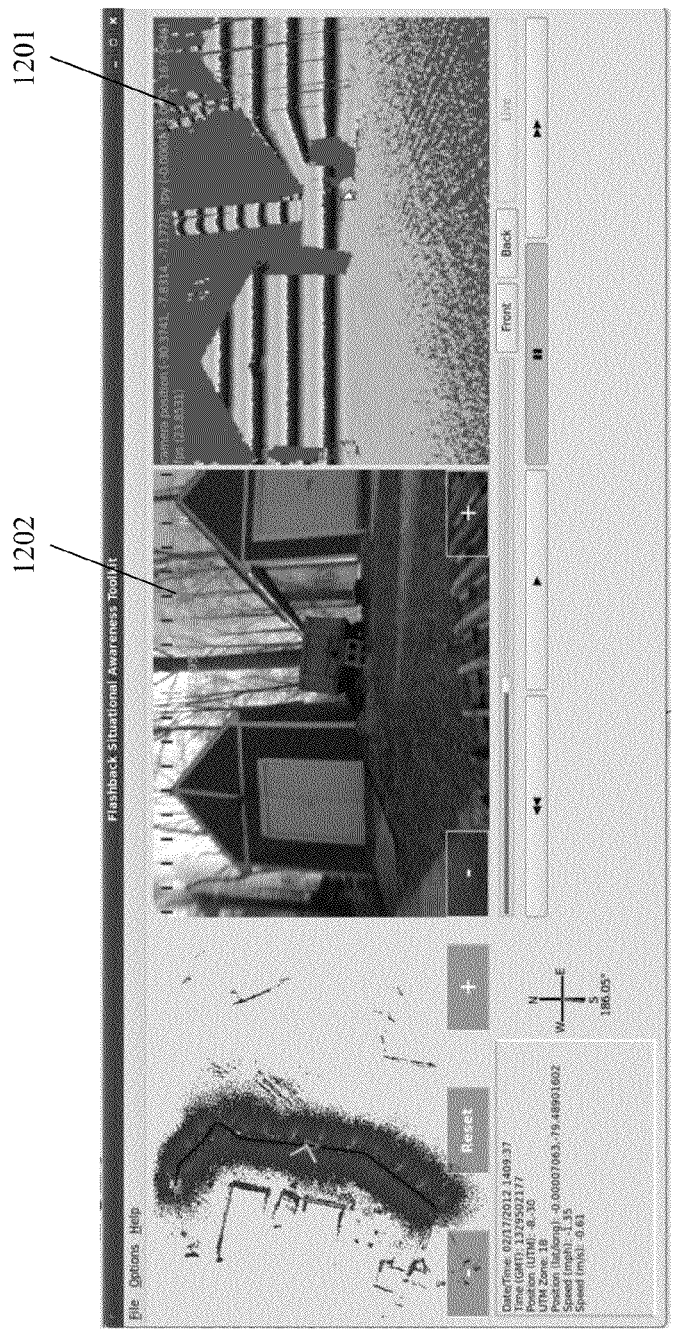
FIGS. 12 and 13 are screen shots illustrating the display of an additional 3D image of the display of the present invention.
Figure 13:
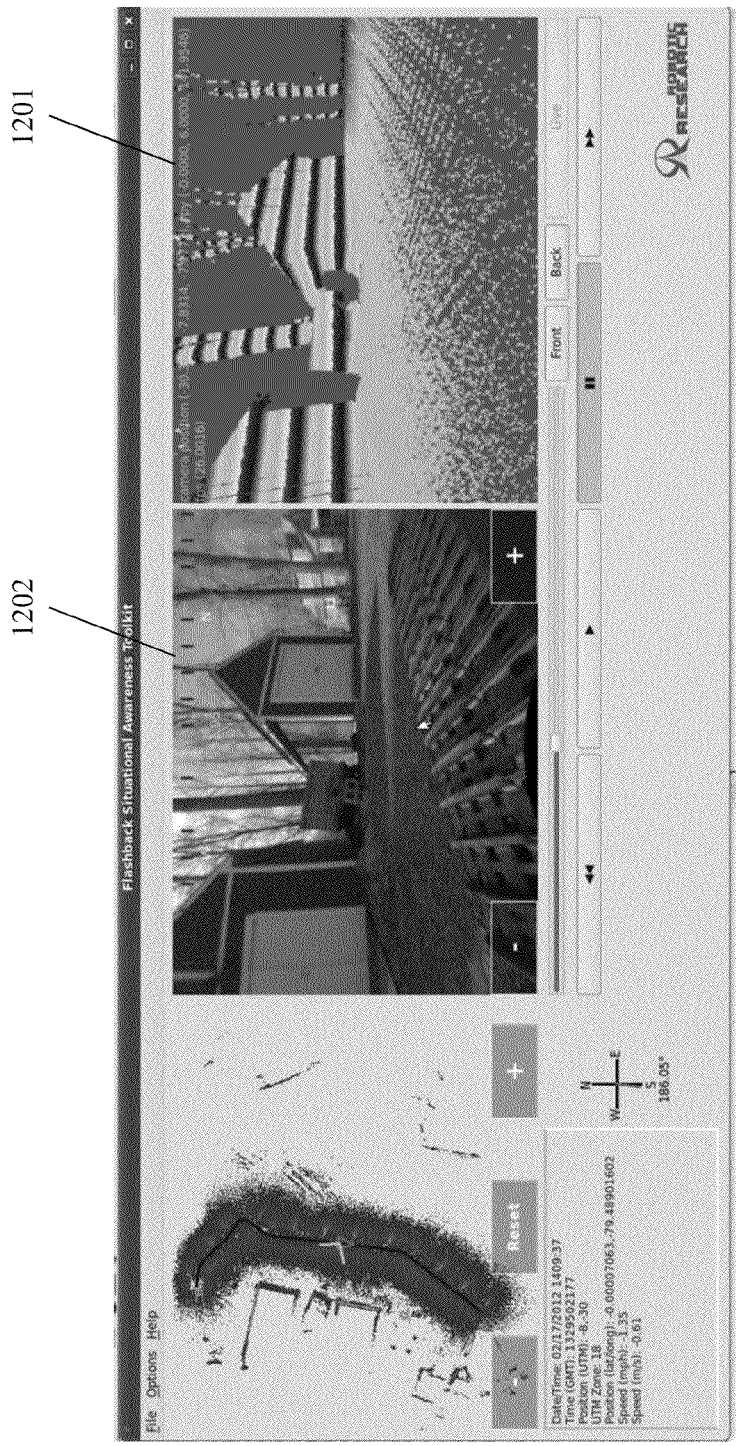

In still another embodiment, the present invention includes a built-in 3D viewer. As shown in FIG. 12, a 3D map 1201 is displayed to the right of the main image 1202, and the viewpoints are locked to each other so that zooming and panning on the image will affect the 3D view and vice versa. As shown in FIG. 13, the image 1202 and 3D map scenes 1201 are adjusted to match the pan/tilt/zoom commands of the operator. This map viewer is extremely flexible, allowing many different types of objects and textures to be displayed. This allows the present invention to be able to load in many different kinds of maps, including maps based on the Kinect, LADAR scanners, stereo cameras, etc., depending upon what sensors/mapping technologies are available.

The goal of the new database/map server system is to give users an easy way to view and compare VESA data from multiple vehicles and/or from multiple data collections. Desired functionality includes being able to search for all data collected in a certain area, taken during a specified time range, or a combination of both. Future work may involve adding a "tag" based search which allows the user to annotate the image data and search by keywords.

Figure 14:
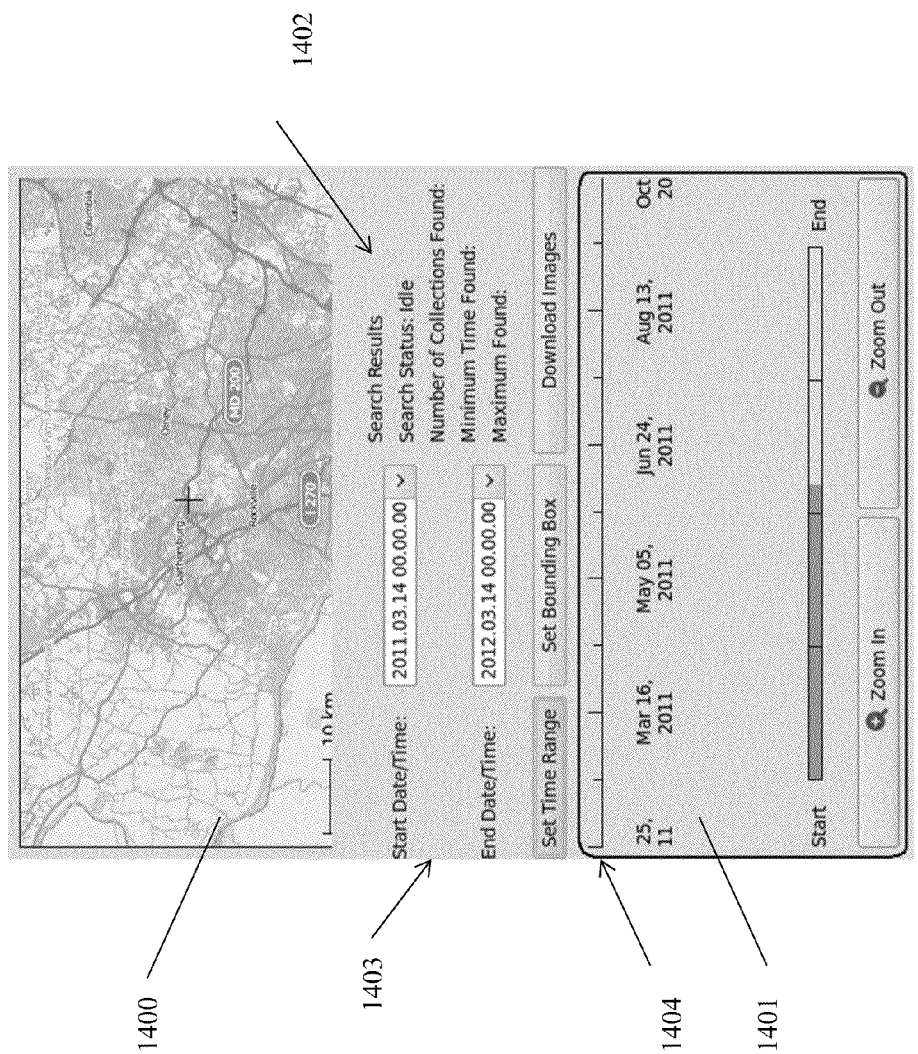
FIG. 14 is a screen shot of the map viewer of the present invention.

One important part of the interface is the ability to easily view maps of the area in which the user wishes to search. The inventors do not want to rely on having an internet connection, so the inventors began work on our own map server. The map data the inventors decided to use an open source map data source that contain street level maps of the entire world at 19 different zoom levels. The map viewer UI can be seen in FIG. 14. The map display 1400 can be zoomed and panned using mouse actions. Users can select the time ranges to search using the calendar inputs 1401 below the map display 1400. Status information 1402 about can be also be seen to the right of the date/time selection 1403. A timeline 1404 is featured at the bottom of the UI map display 1400. When a search is conducted, events 1405 will appear on the timeline 1404. These events 1405 can be selected, and pertinent information is displayed above the timeline 1404.

Figure 15:
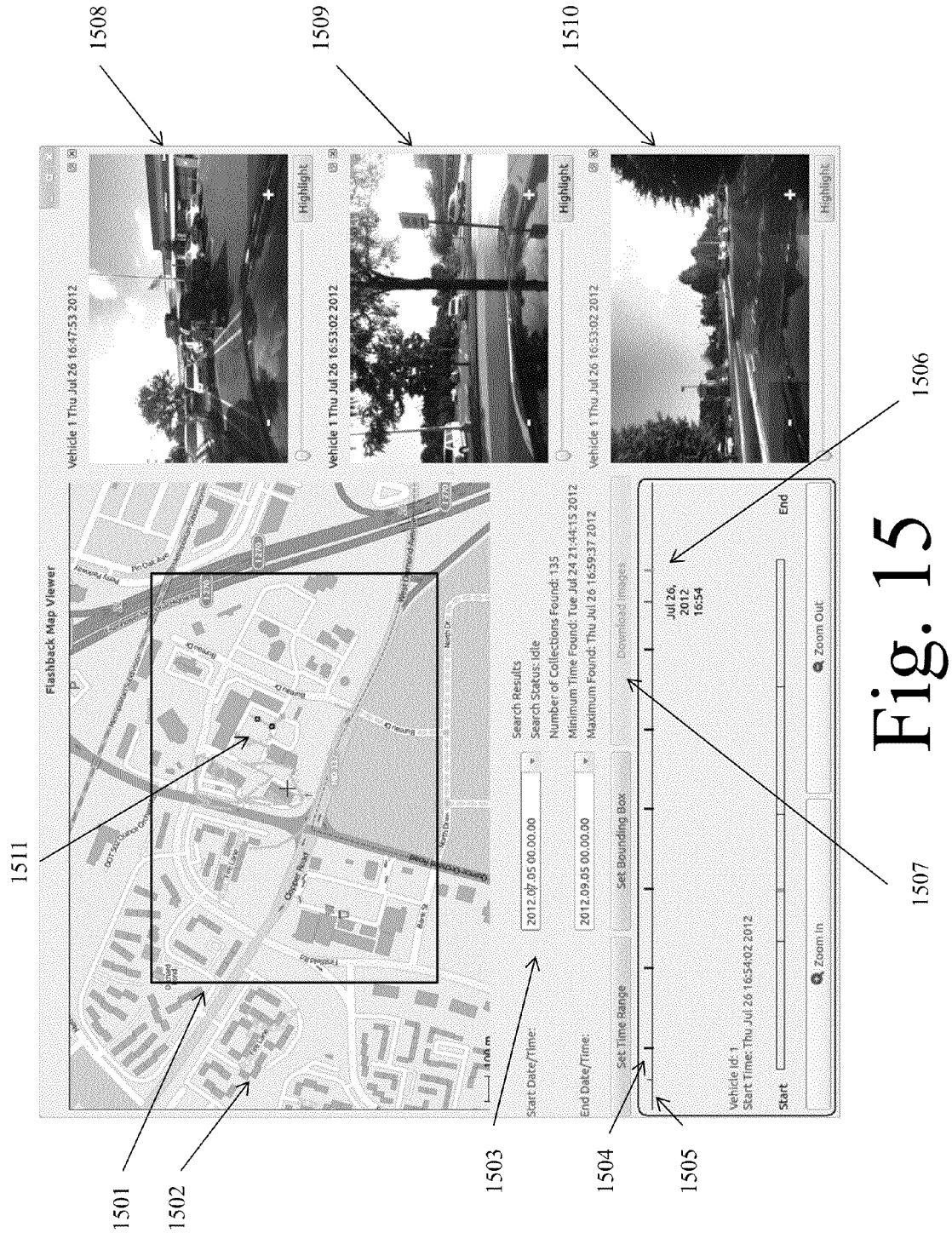
FIG. 15 is a screen shot of the results of a query illustrating navigation paths within the bounding box of the map viewer, along with a series of images from three different points on the timeline.

Now referring to FIG. 15, to query in a specific location, users can drag a bounding box 1501 over a map 1502. The resulting navigation paths 1503 will be drawn on the display map 1502. The search results section 1503 summarizes the collections found in the bounding box 1501. The colored lines 1504 on the timeline 1505 represent the start time of each collection in the search results, where each collection is a ten minute segment of data. When an event 1506 on the timeline 1505 is selected, the collection information is displayed in the search results section 1503. A download images button 1507 requests and downloads the imagery from the database, and subsequently displays 360 degree imagery. Multiple images 1508, 1509, 1510 from different parts of the timeline can be displayed simultaneously. The location of the vehicle for each selected image is represented by an icon on the map 1511.

The inventors have developed a search server and related tools to maintain an efficiently searchable index of collected data. The inventors use a combination of spatial and temporal indexes at varying scales to answer search queries that may include time, distance or producer identity constraints.

When a user sends such a query to a search server, the server uses its query optimizer to determine the best search strategy for the constraints given. The presence and breadth of certain parameters inform the decision as to which type of index the server should employ.

Time/ID search through the global linear indices: The server uses one set of global indices to answer queries such as "Where was this vehicle (all vehicles) between March 2 and April 5?" This set is made up of B+-trees that map time and vehicle ID to a matching collection unit. Queries that include a spatial constraint as well as vehicle ID are also typically processed using this strategy, as the rate limit on data generated by a particular vehicle means that searching through the spatial index would be slower, unless the range of time were very large. When this strategy is used for such spatial queries, the result list is filtered by distance before being delivered to the client.

Spatial search through indices in a hierarchy of grids: For queries such as "What did this vehicle (all vehicles) see within 10 km of point 39N,77W last week (at any time)?" the server looks at a grid hierarchy that splits the surface of the planet into distinct cells.

Data are associated with cells at certain levels of the hierarchy, e.g., those at levels where cell area is 1.5, 6, 24, or 100 $km^2$ (each cell makes up four cells in the next lower level). The server performs a recursive search within this hierarchy, identifying the largest cells that are entirely within the search radius. Cells that are only partially covered by the search area are subdivided until either a completely covered cell is found or the process reaches the lowest level of grid cells.

The server takes its list of matching cells and processes each one (possibly in parallel). Any cell that has been populated will appear in the root-level tree that maps cell IDs to a set of local indices. When the particular cell is completely enclosed within the search area, the server looks in the cell's local temporal index (a B+-tree mapping (time, vehicle ID) to collection unit) for collection units that match the time constraint (which may be $(0, \infty)$). Otherwise, the server will look in either of two indices that The inventors plan to implement in the future: a spatial tree for queries that match only part of the cell but do not specify a time range, or a local spatiotemporal index for queries that specify both a part of the cell and a time range. At present, there is no cell-local spatial index, and all of the cell's entries that match the time constraint are tested for distance to the search center.

The server returns a result set in which it lists each collection or 10-minute unit it found (depending on the result format the client requested). When asked for collections, it lists each collection's important data, including vehicle ID and start time, and when the client requests 10-minute units, the server lists each unit's start time as well as its sequential number within the collection and all of the data that would be returned for the corresponding collection. Start time and vehicle ID make up the unique key with which the client may identify a collection and fetch its raw data. If the client requires, the server will also include a summary of the unit or collection, consisting of a list of time-stamped points at a specified resolution.

To support the database, The inventors have developed an underlying storage system called DBS. DBS is a network-accessible storage layer that will use the resources of many machines to provide transactional read-write access for fixed-size blocks of binary data. The service is designed as a platform that may be used to build large, shared data structures of any type. It is especially appropriate for hierarchical structures such as B-trees that depend on quick access to relatively large blocks (several KB) under read-heavy workloads. The inventors have focused on developing the client's interface to this system as well as implementing basic storage features in order to enable map viewer client usage, and The inventors plan to extend DBS with the goals of scalability and support for ACID guarantees.

Figure 16:
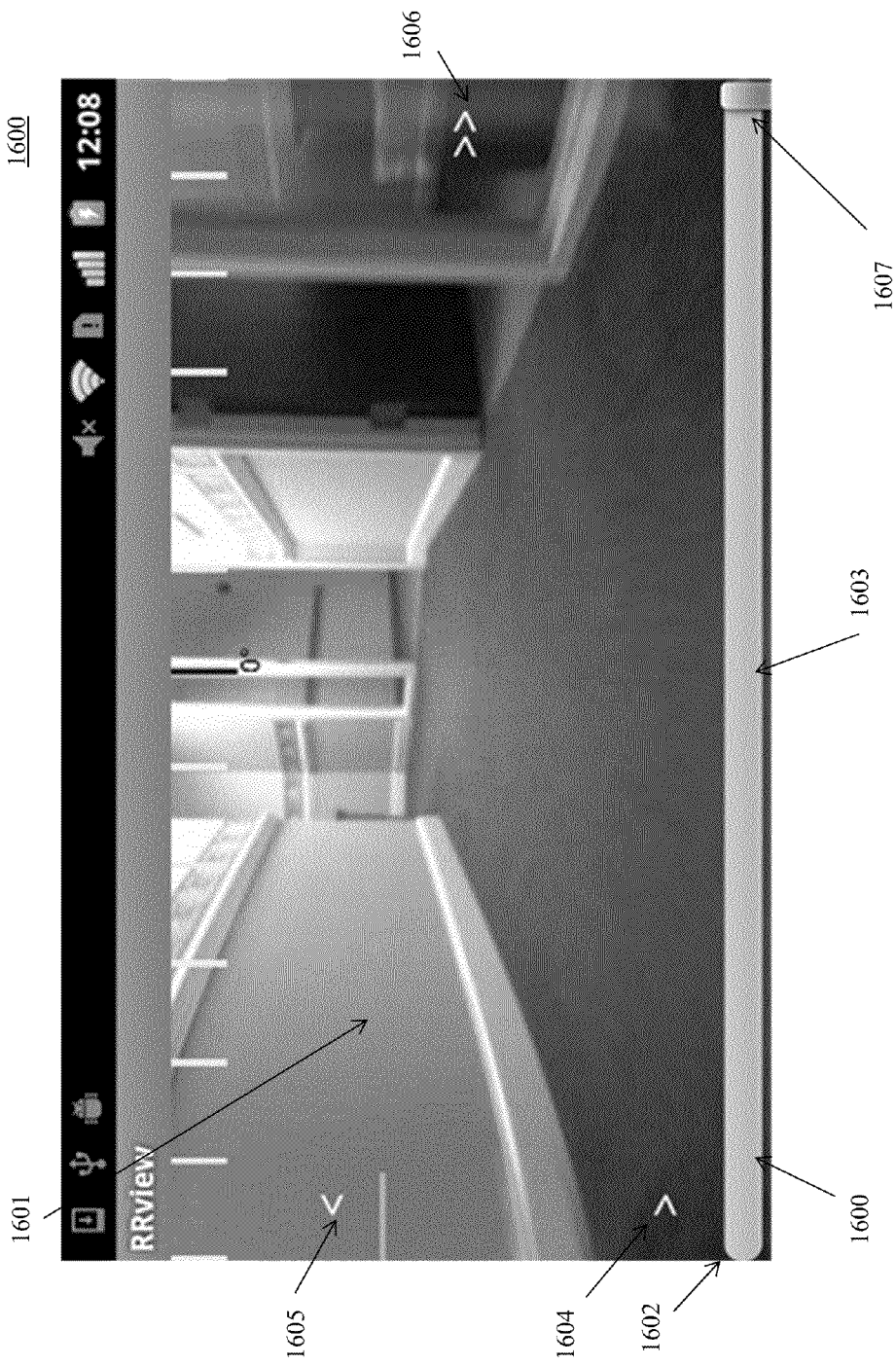
FIG. 16 illustrates a real-time application interface.
Figure 19:
FIG. 19 illustrates where the user clicks on the barrel as the first triangulation point.

In an alternative embodiment, the present invention is embodied and run as an ANDROID application from using post-processed data (written to the phone's sdcard after the mission is completed) or by a real-time, live interface. The ANDROID application streams the images as they come in, automatically refreshing the view on the screen 1600 as shown in FIG. 16 The user can choose to continue watching the live stream, panning, and zooming on the imagery as desired, or can pause the live streaming and review older images as shown in FIG. 19.

Figure 17:
FIG. 17 illustrates the situation where a first packet of an image was dropped, but the rest of the image is viewable.

The images are JPEG compressed and sent as UDP messages. There is a set of configurable parameters (e.g., image size, scale, quality, encoding, and frame rate) that set the desired image properties. One of the parameters, tile size, allows that image to be sent as a series of "tiles" 1701, 1702, 1703, and 1704 that can be reconstructed on the phone to form a full image. The main advantage to using a tiled image is that if a packet or tile is dropped, like tile 1701 in FIG. 17, the rest of the image or tiles 1702, 1703, and 1704 are still viewable as shown in FIG. 17 This way, even though the information is incomplete, the soldier can still have access to some of the imagery, giving them enhanced awareness of the environment. The soldier can later request that any dropped packets be re-transmitted if and when communications quality has improved.

The bandwidth used to transfer the images will depend on how these parameters are set. Tiling images uses higher bandwidth, but has the added advantage of being more robust and resilient to dropped packets. Using a higher quality image and/or increasing the frame rate would also increase the bandwidth. The images shown in the FIGS. 16-18 were sent as 1600×800 pixel images, split into four 400×400 pixel tiles at 50% quality. These images were ~40-55 KB each. As each image is sent to the phone, it is saved locally on the phone's sdcard.

Figure 18:
FIG. 18 illustrates the situation where a live view is paused when the user drags the slide bar.

The user interface has been enhanced to accommodate the new form-factor of the screen in this embodiment. As shown in FIGS. 16 and 18, a slide bar 1600 at the bottom of the screen 1601 lets the user know where the image he or she is currently looking at is located with respect to the last image received as shown in FIG. 18. For example, if the user was looking at the first image out of 10, the slide bar 1600 would be all the way to the left position 1602. If the user was looking at the fifth image out of ten, the slide bar 1600 would be in a centered position 1603. Clicking or dragging the slide bar 1600 pauses the live stream. The user can then review the imagery as desired, using either the forwards and backwards buttons 1604 and 1605 or the slide bar 1600. To return to the live stream, one can press the button on the right side of the screen 1606 or drag the slide bar 1600 all the way to the right position 1607.

An additional functionality to the live-streaming android application allows a user to track a static object of interest (OOI) through multiple frames. This can be useful, for example, if the user identifies a suspicious package near the robot. Using the tracking feature, the user can go forwards and backwards in the video stream and the camera image will stay centered (by panning and tilting the virtual camera) around the desired object. This allows the user to automatically view the OOI from multiple angles, increasing his or her situational awareness while also reducing the workload of the operator. Since the OOI is always centered on the screen, the soldier does not need to spend time and focus to search for the OOI is subsequent imagery.

Figure 20:
FIG. 20 illustrates where the user clicks on the barrel again in the subsequent frame as the second triangulation point.

This functionality is activated by clicking on the OOI in two different frames 1900 and 2000 as illustrated by FIGS. 19 and 20. By using the navigation information of the robot in those frames, along with the positions in the image clicked by the user, the object can be triangulated to its global location.

Figure 21:
Figure 22:

The virtual camera is then adjusted to this new focus point 2100 and 2200 as illustrated by FIGS. 21 and 22.

Figure 23:
FIG. 23 illustrates an image comparison between the two missions where a person has left the scene and one of the barrels has been moved and another robot has entered the scene.

Still another feature of the present invention is an image comparison tool that allows the user compare images from two separate missions. There are two different modalities: two missions can be compared after-action, or a previous mission can be compared to the live mission. The path of the robots from both missions are displayed on the map in two different colors. Clicking the map on an overlapping location (i.e., an area that was seen in both missions) or navigating to that location using the buttons on the app brings up the two images 2301 and 2302 side by side. The navigation information from the time the images were taken is used to align the orientation of the images 2301 and 2302 so that the images 2301 and 2302 shown on the screen are showing the same area of the environment as shown in FIG. 23. The images 2301 and 2302 are locked so that moving a finger on the screen changes the pan/tilt/zoom of both images. There is a menu option to unlock and re-lock the images in case a heading error produces an incorrect alignment. This feature allows a soldier to quickly search for changes that have occurred in the environment and will highlight potential areas of interests and suspicious people and objects over a period of time.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The invention claimed is:

1. A program storage device readable by a computer machine, tangibly embodying program instructions executable by the computer machine to perform method steps for visualization enhancement for situational awareness, said method steps comprising:
   providing a graphical user interface enabling a user to interact with the software program running on the computer machine running;
   the computer machine providing a database of vehicle mission recordings;
   selecting one or more mission recordings;
   displaying a GUI window comprising:
      a navigation map associated with the mission recording wherein,
         the navigation map displays the traveled path traveled of an Unmanned Ground Vehicle (UGV) in first color, if available
         the current position of the vehicle is indicated by a triangle in a second color,
         the front of the vehicle is designated by the point of the triangle,
         the field of view (FOV) of the camera is also indicated on the triangle by the two adjacent lines, shown in a third color when;
      a status display; and
      taking one or more camera images from the mission recording;
   overlaying on the top of the image display is the cardinal direction of the displayed camera image;
   changing the direction with camera panning within the still frame image;
   progressing through the timeline of a mission using a horizontal scroll bar slider wherein each slider increment is equivalent to moving one second in time;
   allowing a user to jump to any point from the beginning to the end of the mission;
   quickly incrementing or decrementing of the slider;
   providing 'Front' and 'Back' buttons next to the scroll bar;
   allowing the user to toggle between the front camera and the rear camera of the vehicle;
   providing a set of playback controls that allow the user to play, pause, rewind, and fast forward through the images,
   repeatedly pressing the rewind or fast-forward buttons increases the speed;
   tagging events in the mission recoding;
   loading multiple mission files;
   displaying each loaded mission file on separate timelines;
   each timeline is zoom-able using buttons at the bottom of the screen;
   the user can drag on the timeline to display different portions of the timeline;
   below the timelines, an overview bar displays, as denoted by a first colored line, what portion of the overall timeline is being displayed and the current image location, a denoted by second colored line or bar;
   the second colored line or bar can be dragged to quickly access other portions of the timelines;
   events are noted by a colored line or bar on the timeline;
   each event can be selected and the comment from that event is displayed beneath the timelines;
   the (x,y) location of that comment is plotted as a colored circle on the map;
   the current image position is represented by a colored line on the timelines; and
   dragging the current image position colored line to move forward or backward in the images.

2. The method of claim 1, wherein
   if the FOV lines are centered towards the back of the vehicle, the camera image being displayed is taken from the rear camera of the vehicle;
   if the FOV lines are spread far apart (indicating a wide FOV), the image is zoomed far out;
   if the FOV lines are close together, the image is zoomed in to a smaller section of the environment.

3. The method of claim 1, wherein an aerial imagery 405 is displayed as well and the navigation map superimposed or laid over top of the aerial imagery using GPS to align the aerial imagery with the navigation map.

4. The method of claim 1, wherein the information displayed the status display includes the date and time of the mission, along with a GMT time in seconds, the position of the UGV in Universal Transverse Mercator (UTM) and lat/long position, and vehicle speed.

5. The method of claim 1, wherein listed below a compass is a cardinal direction of the vehicle in degrees.

6. The method of claim 1, further comprising the steps of Providing a touch screen mode;
   providing "+"and "−" display buttons used to zoom in and out, respectively; and
   providing a "Reset" display button to re-center the navigation map.

7. The method of claim 1, further comprising the steps of receiving data from a UGV mission;
   storing data from the UGV in a database of UGV mission recordings opening/viewing the data.

8. The method of claim 7, wherein
the data required to run the present invention consists of
image files (.jpg) from the vehicle's cameras and daq
files that record the navigation information;
these files are time and date stamped;
placing all the image and daq files from a single mission
into a folder on the computer on which a user will be
executing the program,
each mission has its own separate folder to ensure that the
data loads correctly; and
retrieving the files from the vehicle locally or remotely over
a computer network.

9. The method of claim 1, further comprising the steps of
exploring the images of the path mapped by the vehicle in
space by clicking on any point of the navigation map;
and
exploring the images of the path mapped by the vehicle in
time by using the horizontal scroll bar or playback controls below the camera image;
selecting a point on either the navigation map or the scroll
bar to display the corresponding camera image at the
vehicle's respective time and position;
clicking and dragging the camera image to rotate the camera to further inspect the image;
using a scroll button on a mouse to zoom in or out of the
image when the cursor is on the image; and
clicking the left and right mouse buttons simultaneously
and dragging on the image, a user can also zoom in or out
of the image.

10. The method of claim 1, wherein
providing LADAR maps as semi-transparent allowing the
user to view the aerial imagery underneath the map; and
panning and zooming in and out on the navigation map,
LADAR map, and aerial imagery get a detailed view of
the area.

11. The method of claim 1, wherein events are tagged
automatically in the recoding by the UGV.

12. The method of claim 1, further comprising the steps of
saving, adding, editing, or deleting an event;
rearranging the order of time lines by moving them up or
down in order for easier comparison; and
closing a time line if no longer needed.

13. The method of claim 1, further comprising the steps of
providing a built-in 3D viewer;
displaying a 3D map in addition to the navigation and
camera images;
locking the viewpoints of three images to each other so that
zooming and panning on the image will affect the 3D
view and vice versa;
adjusting the 3d map, navigation map, and image to match
the pan/tilt/zoom commands of the operator.

14. The method of claim 1, further comprising the steps of
adding one or more tags to a mission;
annotating the image data with one or more tags;
searching one or more missions by the tag.

15. The method of claim 14, further comprising the steps of
providing a map server;
providing a map user interface;
providing controls so that the map display can be zoomed
and panned using mouse actions;
selecting the time ranges to search using calendar inputs
placed below the map display;
displaying status information to the right of the date/time
selection;
providing a timeline featured at the bottom of the UI map
display;
conducting a search,
when a search is conducted, events will appear on the
timeline;
these events can be selected, and pertinent information is
displayed above the timeline.

16. The method of claim 1, further comprising the steps of
executing the method on a mobile phone application running on a mobile phone;
writing to a phone's SD card after the mission is completed
using post-processed data
displaying the data in real-time on a live interface on the
mobile phone;
streaming the images as they come in from the UGV to the
mobile phone;
automatically refreshing the view on the display screen;
choosing to continue watching the live stream;
panning and zooming on the imagery; and
pausing the live streaming and reviewing older images.

17. The method of claim 16, further comprising the steps of
recording images in JPEG format;
compressing the JPEG images;
sending the compressed JPEG images as User Datagram
Protocol (UDP) messages;
providing a set of configurable parameters that set the
desired image properties;
one configurable parameter is tile size;
sending an image as a series of tiles form the UGV to
the mobile phone;
reconstructing on the phone the series of tiles to form
a full image; and
storing each image sent to the phone locally on the
phone's sdcard.

18. The method of claim 17, further comprising the steps of
providing a slide bar at the bottom of the display screen
providing a reference as to where the currently viewed
image is located with respect to the last image received;
clicking or dragging the slide bar to pause the live stream;
reviewing the imagery as desired, using either the forwards
and backwards buttons or the slide bar; and
returning to the live stream by pressing the button on the
right side of the screen or dragging the slide bar all the
way to the end of the slide bar.

19. The method of claim 18, further comprising the steps of
selecting or clicking on a static object of interest (OOI)
through two or more frames;
using the navigation information of the robot in those
frames, along with the positions in the image clicked or
selected;
triangulating the object to its global position;
adjusting the virtual camera to this new focus point;
moving forward and backward in the video stream;
centering the camera image by panning and tilting the
virtual camera around the object; and
viewing the object from multiple angles.

20. The method of claim 19, further comprising the steps of
displaying path of the robots from both missions are displayed on the map in two different colors;
clicking the map on an overlapping location;
navigating to that location using the buttons on the app
brings up the two images side by side;
using navigation information from the time the images
were taken to align the orientation of the images so that
the images shown on the screen are showing the same
area of the environment;
locking the images so that moving a finger on the screen
changes the pan/tilt/zoom of both images; and
comparing images from two separate missions.

21. The method of claim 20, further comprising the steps of providing a menu option to unlock and re-lock the images in case a heading error produces an incorrect alignment.

22. The method of claim 20, wherein two missions can be compared after-action or a previous mission can be compared to the live mission.

23. A program storage device readable by a computer machine, tangibly embodying program instructions executable by the computer machine to perform method steps for visualization enhancement for situational awareness, said method steps comprising:
providing a graphical user interface enabling a user to interact with the software program running on the computer machine running;
the computer machine providing a database of vehicle mission recordings;
selecting one or more mission recordings;
displaying a GUI window comprising:
    a navigation map associated with the mission recording wherein,
        the navigation map displays the traveled path traveled of an Unmanned Ground Vehicle (UGV) in first color, if available
        the current position of the vehicle is indicated by a triangle in a second Color,
        the front of the vehicle is designated by the point of the triangle,
        the field of view (FOV) of the camera is also indicated on the triangle by the two adjacent lines, shown in a third color when;
    a status display; and
    taking one or more camera images from the mission recording;
overlaying on the top of the image display is the cardinal direction of the displayed camera image;
changing the direction with camera panning within the still frame image;
progressing through the timeline of a mission using a horizontal scroll bar slider wherein each slider increment is equivalent to moving one second in time
allowing a user to jump to any point from the beginning to the end of the mission;
quickly incrementing or decrementing of the slider;
providing 'Front' and 'Back' buttons next to the scroll bar;
allowing the user to toggle between the front camera and the rear camera of the vehicle;
providing a set of playback controls that allow the user to play, pause, rewind, and fast forward through the images,
repeatedly pressing the rewind or fast-forward buttons increases the speed;
adding one or more tags to a mission;
annotating the image data with one or more tags;
searching one or more missions by the tag, providing a map server;
providing a map user interface;
providing controls so that the map display can be zoomed and panned using mouse actions;
selecting the time ranges to search using calendar inputs placed below the map display;
displaying status information to the right of the date/time selection;
providing a timeline featured at the bottom of the UI map display;
conducting a search,
when a search is conducted, events will appear on the timeline;
these events can be selected, and pertinent information is displayed above the timeline;
querying a specific location;
dragging a bounding box over the map;
the resulting navigation paths will be drawn on the display map;
search results summarizes summarizing the collections are found in the bounding box;
colored lines on the timeline represent the start time of each collection in the search results, where each collection is a ten minute segment of data; and
when an event on the timeline is selected, the collection information is displayed in the search results section.

24. The method of claim 23, further comprising the steps of downloading and displaying 360 degree imagery from the database; and
displaying multiple images from different parts of the timeline simultaneously.

25. The method of claim 24, further comprising the steps of providing a search server;
using a combination of spatial and temporal indexes at varying scales to answer search queries that may include time, distance or producer identity constraints;
sending a query to a search server;
using a query optimizer to determine the best search strategy for the constraints given by
the search server;
conducting a Time/ID search through global linear indices;
conducting a spatial search through indices in a hierarchy of grids where the server looks at a grid hierarchy that splits the surface of the planet into distinct cells,
data are associated with cells at certain levels of the hierarchy;
the server performs a recursive search within this hierarchy, identifying the largest cells that are entirely within the search radius;
cells that are only partially covered by the search area are subdivided until either a completely covered cell is found or the process reaches the lowest level of grid cells;
the server takes its list of matching cells and processes each one;
any cell that has been populated will appear in the root-level tree that maps cell IDs to a set of local indices;
when the particular cell is completely enclosed within the search area, the server looks in the cell's local temporal index for collection units that match the time constraint, otherwise, the server will look in either a spatial tree for queries that match only part of the cell but do not specify a time range, or a local spatiotemporal index for queries that specify both a part of the cell and a time range; and
the search server returns a result set in which it lists each collection or 10-minute unit it found.

26. The method of claim 25, further comprising the steps of querying a collect from the search server;
listing each collection's data;
and when the client requests 10-minute units, the server lists each unit's start time as well as its sequential number within the collection and all of the data that would be returned for the corresponding collection; and
including a summary of the unit or collection, consisting of a list of time-stamped points at a specified resolution.

* * * * *